United States Patent [19]
Gage et al.

[11] Patent Number: 5,561,655
[45] Date of Patent: Oct. 1, 1996

[54] APPARATUS AND METHOD FOR DIFFERENTIAL TRACKING IN A MAGNETO-OPTIC DATA STORAGE SYSTEM USING MARK EDGE DETECTION

[75] Inventors: Edward C. Gage, Fairport; James A. Barnard, Scottsville, both of N.Y.

[73] Assignee: Eastman Kodak Company, Rochester, N.Y.

[21] Appl. No.: 349,162

[22] Filed: Dec. 2, 1994

[51] Int. Cl.⁶ .................................................. G11B 7/00
[52] U.S. Cl. .................... 369/110; 369/13; 369/44.26; 369/44.41; 369/109; 369/124
[58] Field of Search .......................... 369/110, 13, 107, 369/44.41, 124, 44.32, 44.26, 109

[56] References Cited

U.S. PATENT DOCUMENTS

| | | | |
|---|---|---|---|
| 4,562,564 | 12/1985 | Bricot et al. | 369/275.3 |
| 4,707,816 | 11/1987 | Yonezawa et al. | 369/105 |
| 4,748,609 | 5/1988 | Yonezawa et al. | 369/105 |
| 4,879,708 | 11/1989 | Getreuer et al. | 369/124 |
| 4,884,259 | 11/1989 | Horikawa et al. | 369/32 |
| 4,908,811 | 3/1990 | Yokogawa et al. | 369/54 |
| 4,959,823 | 9/1990 | Getreuer et al. | 369/44.26 |
| 5,017,768 | 5/1991 | Takagi | 369/44.41 |
| 5,073,880 | 12/1991 | Maeda et al. | 369/44.26 |
| 5,088,080 | 2/1992 | Ishibashi et al. | 369/44.26 |
| 5,113,386 | 5/1992 | Whitehead et al. | 369/44.41 |
| 5,166,914 | 11/1992 | Shimada et al. | 369/44.26 |
| 5,166,921 | 11/1992 | Matsui | 369/275.3 |
| 5,177,726 | 1/1993 | Terada | 369/54 |
| 5,206,847 | 4/1993 | Kanda | 369/44.26 |
| 5,208,792 | 5/1993 | Imanaka | 369/13 |
| 5,235,576 | 8/1993 | Shigemori | 369/44.26 |
| 5,255,263 | 10/1993 | Van Uijen et al. | 369/275.3 |
| 5,270,991 | 12/1993 | Verboom | 369/275.3 |
| 5,282,188 | 1/1994 | Gage | 369/112 |
| 5,295,131 | 3/1994 | Ishibashi et al. | 369/275.3 |
| 5,321,675 | 6/1994 | Ito et al. | 369/275.4 |
| 5,349,576 | 9/1994 | Gage | 369/13 |
| 5,402,411 | 3/1995 | Maeda et al. | 369/109 |
| 5,406,545 | 4/1995 | Kadowaki | 369/44.26 |
| 5,416,764 | 5/1995 | Chikazawa et al. | 369/107 |

OTHER PUBLICATIONS

M. Yamamoto, et al., "Diffraction Pattern from Magnetooptical Edges," Jpn. J. Appl. Phys., vol. 32, pp. 5206–5209. Nov. 1993.
E. Yamaguchi, et al., "Edge Shift Characteristics of a Magnetooptical Edge Detection Signal," Jpn. J. Appl. Phys., vol. 32, pp. 5349–5353, Nov. 1993.
M. D. Levenson, et al., "Edge detection for magnetooptical data storage,", Applied Optics, vol. 30, No. 2, pp. 232–252, Jan. 1991.
M. Mansuripur, "Detecting transition regions in magneto–optical disk systems,", Appl. Phys. Lett., 55(8), pp. 716–717, Aug. 1989.
A. Marchant, "Optical Recording: A Technical Overview," Addison–Wesley, Reading, Mass., 1990, pp. 172–181.
Data Sheet, VPS700 lens, Blue Sky Research, San Jose, Calif.

*Primary Examiner*—Georgia Y. Epps
*Assistant Examiner*—Kim-Kwok Chu
*Attorney, Agent, or Firm*—Raymond L. Owens

[57] ABSTRACT

An apparatus and method for providing a tracking error signal in an optical system in which a radiation beam is applied to an optical storage medium having a number of marks formed thereon. A return beam resulting from application of the incident radiation beam to the medium is separated into a first polarization component and a second polarization component. First and second detectors detect the first and second polarization components and generate first and second detected signals therefrom. A tracking error signal is generated from the first and second detected signals, and is responsive to variations in the return beam arising from diffraction of the incident beam from, for example, cross-track edges of the marks on the medium. The marks may be previously-recorded data marks or preformatted tracking marks, and the medium may be a non-grooved magneto-optic medium.

20 Claims, 2 Drawing Sheets

APPARATUS AND METHOD FOR DIFFERENTIAL TRACKING IN A MAGNETO-OPTIC DATA STORAGE SYSTEM USING MARK EDGE DETECTION

FIELD OF THE INVENTION

The present invention relates generally to optical data storage systems. More particularly, the present invention relates to an improved apparatus and method for generating a tracking error signal from a magneto-optic storage medium in an optical data storage system.

BACKGROUND OF THE INVENTION

Tracking error signals are used in optical storage systems to control the position of a radiation beam with respect to a data track of an optical storage medium. In the case of a magneto-optic (MO) optical storage medium, on which data is generally stored in the form of marks of distinct magnetization, an incident radiation beam reflected from the medium can be used to detect the distinct magnetization and thereby the recorded data. Most commercially-available magneto-optic storage media include a preformed diffracting structure, often referred to as a pregroove, groove or guide track, which provides varying amounts of diffraction of the incident radiation beam depending upon the position of the beam relative to a data track. The pregroove is used to generate a tracking error signal which may be, for example, of the type commonly referred to as a push-pull tracking signal. Push-pull and other exemplary tracking signals are described in pp. 172–181 of A. Marchant, "Optical Recording: A Technical Overview," Addison-Wesley Reading, Massachusetts, which are incorporated by reference herein.

FIG. 1A shows a side-sectional view of a portion of a pregrooved magneto-optic storage medium 10 in accordance with the prior art. The exemplary pregrooves consist of a number of alternating raised regions 12 and lower regions 14. Although not apparent from the view shown, the pregrooves are generally arranged on the surface of the medium 10 in the form of a spiral or concentric circles. The pregrooves thus generally coincide with data tracks containing recorded data, and are used by a tracking servo system to maintain the position of the incident radiation beam on a given data track. It should be noted that in FIG. 1A the height of the raised regions has been exaggerated for clarity. The separation between adjacent raised regions, also referred to as track pitch, may be expressed as a duty cycle. Although the example shown illustrates a medium with a pregroove duty cycle of about 50%, other media could utilize other duty cycles, for example, in a range from about 20% to 80%. The position of the incident beam relative to the pregroove can be determined by, for example, detecting variations in diffraction patterns in a return beam reflected and diffracted from the medium.

FIG. 1A also shows a number of downward arrows 16 and upward arrows 17, which correspond to high or low logic states in recorded binary data and indicate the direction of a magnetization vector in a given region of the medium 10. Depending on the direction of the magnetization vector in the marked and unmarked regions of medium 10, a positive or negative amount of Kerr rotation will be applied to the plane of polarization of the return beam if a linearly-polarized incident beam is applied to the medium. A differential detection system may then be used to reconstruct the recorded data from variations in the Kerr rotation present in the return beam.

FIG. 1B shows an exemplary multi-element focus and tracking detector 18 which may be used in an optical head to detect the return beam reflected and diffracted from the medium 10. The return beam is focused on the detector 18 and the amount of intensity detected in the various detector elements is indicative of the position of the incident radiation beam with respect to the pregroove. The multi-element detector 18 includes four detector elements a, b, c and d, each of which generates an electrical signal indicative of the light intensity incident thereon. A pregroove of the type shown in FIG. 1A may be used to provide a push-pull tracking error signal given by c–d, indicating that the signal from detector element d is subtracted from the signal generated in detector element c. When the incident radiation beam is properly positioned on-track relative to the pregroove, the portion of the return beam intensity detected by detector elements c and d will be the same. If the incident beam goes off-track in a cross-track direction 20, an increased amount of intensity will be detected by either element c or element d. The multi-element detector 18 may also provide a spot-size focus error signal given by (a+b)–(c+d). Further detail regarding the multi-element detector of FIG. 1B may be found in U.S. Pat. No. 5,113,386 entitled "Focus and Tracking Error Detector Apparatus for Optical and Magneto-Optical Information Storage Systems," which is assigned to the assignee of the present invention and incorporated herein by reference. Although the detector 18 provides simple and efficient tracking in a magneto-optic system, it generally requires that the medium include a diffracting structure such as the pregroove shown in FIG. 1A.

Other types of optical media, such as write-once media, can generate tracking error signals without the need for a pregroove or other diffracting structure on the medium. As used herein, write-once media are intended to include mass-produced read-only media such as those commonly used in compact disks (CDs). An exemplary write-once tracking technique utilizes diffraction from preformatted tracking marks, also referred to as servo marks, to generate a sampled phase tracking error signal such as that described in pp. 180–181 of the above-cited A. Marchant reference. However, absent the use of, for example, a multi-spot beam with separate tracking detectors, such preformatted marks have generally not been used to provide a tracking error signal for a magneto-optic medium. The tracking techniques used for magneto-optic media are thus often incompatible with those used for other types of media, such that optical storage media drives typically cannot handle, for example, both magneto-optic and write-once optical media.

A number of techniques have been developed which use mark edge detection to read data stored on magneto-optic media. See, for example, M. Mansuripur, "Detecting Transition Regions in Magneto-optical Disk Systems," Applied Physics Letters, Vol. 55, No. 8, August 1989; M. Levenson et al., "Edge Detection for Magnetooptical Data Storage," Applied Optics, Vol. 30, No. 2, pp. 232–252, January 1991; M. Yamamoto et al., "Diffraction Pattern from Magnetooptical Edges," Jpn. J. Appl. Phys., Vol. 32, pp. 5206–5209, November 1993; and E. Yamaguchi et al., "Edge Shift Characteristics of a Magnetooptical Edge Detection Signal," Jpn. J. Appl. Phys., Vol. 32, pp. 5349–5353, November 1993; all of which are incorporated by reference herein. However, mark edge detection has generally been used to detect in-track edges suitable for generating a read-out data signal. In addition, these techniques have been used primarily with pregrooved magneto-optic media, and therefore have typically not been applied to generate tracking error signals other than those commonly used with pregrooved media. Systems using these edge detection data read-out techniques therefore generally remain incompatible with certain tracking error signals used with write-once and other types of optical media.

As is apparent from the above, a need exists for improved tracking error signal generation in magneto-optic storage systems such that simple and accurate tracking may be provided on magneto-optic media which do not include a pregroove or a similar preformed diffracting structure.

SUMMARY OF THE INVENTION

The present invention provides an apparatus and method for generating a differential tracking signal from a non-grooved storage medium using mark edge detection. An exemplary apparatus in accordance with one aspect of the present invention may include means for separating a return beam, resulting from application of a radiation beam to an optical storage medium, into a first polarization component and a second polarization component; a first detector adapted to receive the first polarization component of the return beam and to generate a first detected signal therefrom; a second detector adapted to receive the second polarization component of the return beam and to generate a second detected signal therefrom; and means for generating a tracking error signal from the first and second detected signals. The tracking error signal is responsive to variations in the return beam resulting from diffraction of the incident beam by, for example, cross-track edges of marks on the medium.

In accordance with another aspect of the present invention, a method is provided which may include the steps of separating a return beam resulting from application of the radiation beam to the medium into a first polarization component and a second polarization component; detecting the first polarization component of the return beam to obtain a first detected signal; detecting the second polarization component of the return beam to obtain a second detected signal; and combining the first and second detected signals to provide a tracking error signal which is responsive to variations in the return beam resulting from diffraction of the incident beam from the marks. The present invention utilizes cross-track mark edge detection to produce a tracking error signal indicative of the position of a mark or data track relative to an incident radiation beam. The tracking error signal of the present invention can be readily generated using magneto-optic media which do not include a pre-groove. For example, the tracking error signal of the present invention can be generated from a non-grooved magneto-optic medium using formatted tracking marks similar to those used with write-once media. An optical drive with one set of tracking hardware can then support both magneto-optic and write-once media, as well as other media types.

Further features of the invention, its nature and various advantages will become more apparent from the accompanying drawings and following detailed description of the invention.

DETAILED DESCRIPTION OF THE INVENTION

Figure 2:
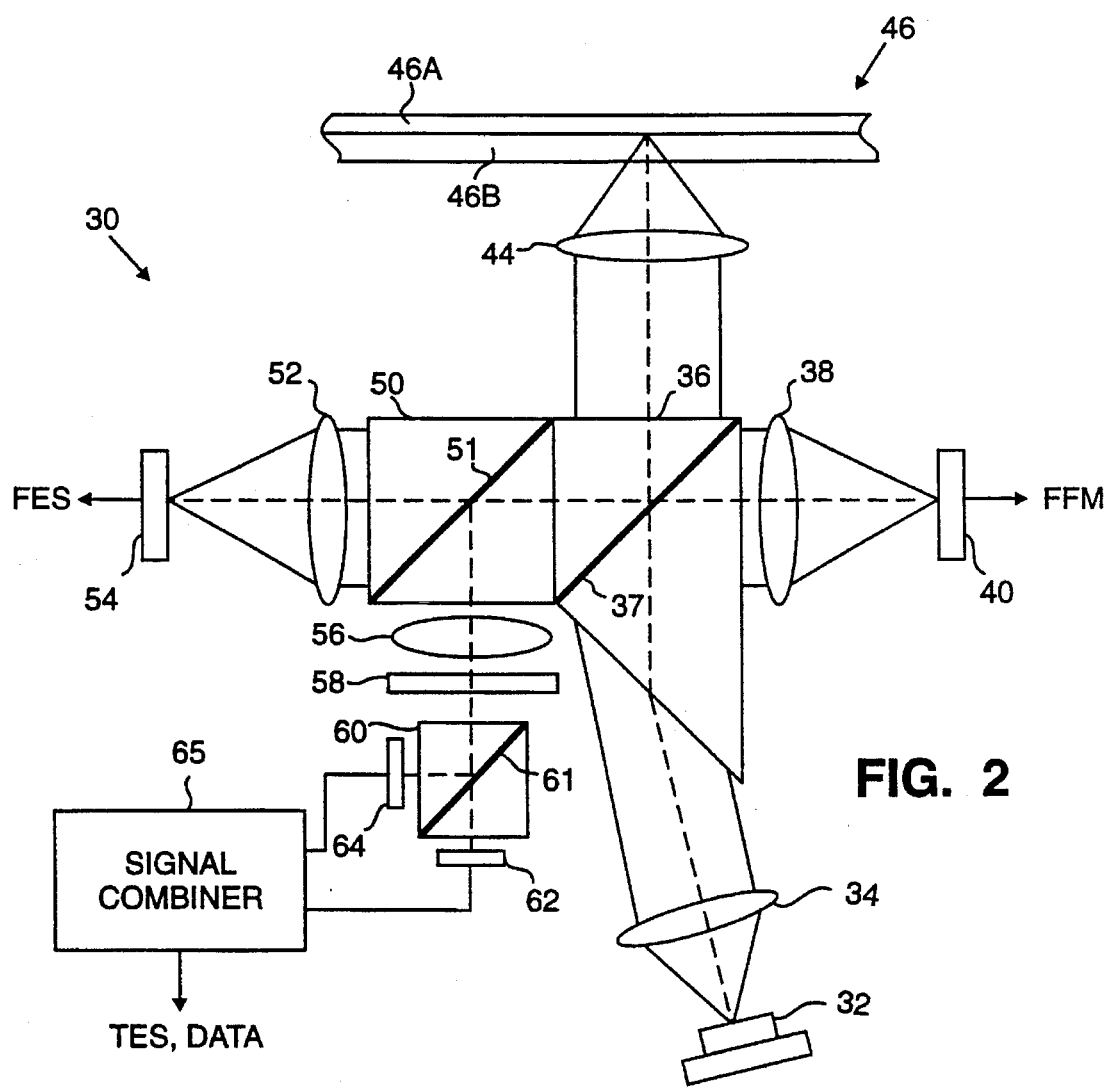
FIG. 2 shows an exemplary optical storage system with differential tracking in accordance with the present invention.

FIG. 2 shows an exemplary optical storage system 30 with differential tracking in accordance with the present invention. An incident radiation beam is generated by an optical source 32, which may be, for example, a laser diode, a laser or an LED. The source produces an incident radiation beam at a given wavelength, which will generally vary depending upon the application. An exemplary wavelength suitable for use in the system 30 is about 780 nanometers. The radiation beam from optical source 32 is collimated by a collimating lens 34, which in this embodiment may have a focal length on the order of 8 mm. The collimated radiation beam is transmitted through a polarization beam expander/splitter 36. Alternative beam expansion techniques could be used, such as including a circularizing lens (not shown) in the path of the incident beam, and would generally alter the desired focal length of lens 34. A suitable circularizing lens is the model VPS700 lens available from Blue Sky Research of San Jose, Calif. The expander/splitter 36 may have an s-polarization reflectivity of about 100% and a p-polarization reflectivity of about 20%, indicating that 100% and 20% of the s-polarized beam components and p-polarized beam components, respectively, are reflected by an internal surface 37, and any remaining portions are transmitted through the surface 37. A portion of the incident radiation beam is thus reflected by surface 37 toward a detector focusing lens 38 and thereby focused onto a front facet detector 40. The reflected portion of the linearly-polarized radiation beam thus includes both s-polarized and p-polarized components, which are detected in detector 40 to provide an indication of the intensity level of the incident radiation beam in the form of a front facet monitor (FFM) signal. The FFM signal from detector 40 may be used, for example, to normalize a data or tracking signal in the manner described below, or in a source power servo loop (not shown) to maintain the output power level of source 32 at a desired value.

The portion of the incident radiation beam which is not reflected by surface 37 to front facet detector 40 passes through surface 37 and is incident on an objective lens 44. The surface 37 of polarization beam splitter/expander 36 transmits a linear p-polarization of the radiation beam, which is perpendicular to the s-polarized portion of the radiation beam reflected by surface 37. The direction of the incident beam may be altered by including additional optical elements which are not shown, such as a turning prism or fully-reflecting mirror, between the beam splitter 36 and the objective lens 44. For example, a turning prism or reflecting mirror could be arranged to reflect the beams by 90° to facilitate placement of the components of system 30 relative to the storage medium in a reduced-height optical disk drive.

Objective lens 44 focuses the incident beam onto an optical storage medium 46. Optical components 34, 36 and 44 represent only an exemplary means of applying an incident radiation beam to the medium, and any of a number of other arrangements of components could be used as an application means herein. The storage medium 46 typically includes data tracks (not shown) arranged in a spiral or concentric circles on a data storage surface 46A. A portion of the medium 46 is shown in a side-sectional view in FIG. 2. The storage medium may also include a transparent substrate 46B which serves as a protective layer over the data storage surface 46A. The exemplary medium 46 does not include the pregroove or similar light-diffracting structure typically found on many presently-available magneto-optic media. A data track in accordance with the present invention thus need not coincide with a pregroove, but instead refers generally to an arrangement of data marks, such as a given concentric circle of data marks or a portion of a spiral of data marks, recorded on a medium. A data track herein may also refer to a portion of a completely or partially unrecorded medium on which such marks are to be written. The incident radiation beam reads data previously recorded in the form of marks on storage medium 46 by detecting variations in a return beam reflected from the medium. The system 30 may also be used to record data on the medium 46 by modifying the power level of the incident beam and/or by providing additional recording system elements the placement and operation of which are generally well-known in the art.

Figure 1A:
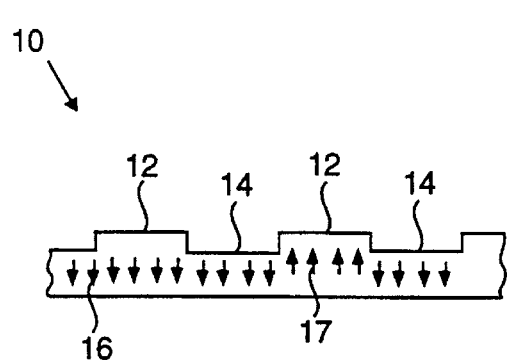
FIG. 1A is a side-sectional view of a portion of a pregrooved magneto-optic storage medium in accordance with the prior art.
Figure 1B:
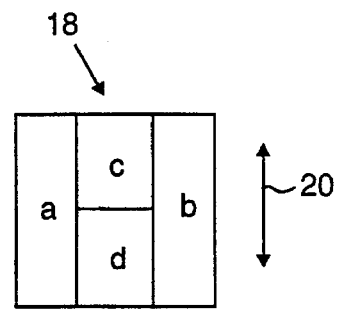
FIG. 1B shows an exemplary prior art focus/tracking detector array suitable for use in an optical head to generate focus and tracking error signals from the pregrooved magneto-optic storage medium of FIG. 1A.

In this embodiment, the incident beam applied to the medium has a substantially linear polarization. Interaction with the data storage surface 46A causes the incident radiation beam to be reflected and diffracted therefrom. The resulting radiation beam, referred to herein as a return beam, generally has an elliptical polarization due to Kerr effect variations produced at the medium surface. The return beam is collimated by objective lens 44, substantially reflected by surface 37, and then applied to a polarization beam splitter 50 which may have an s-polarization reflectivity of about 100% and a p-polarization reflectivity of about 75%. As a result, about 25% of the p-polarized portion of the return beam is transmitted through surface 51 to a detector focusing lens 52. The lens 52 focuses the transmitted portion of the return beam onto a detector 54, which may include multiple detector elements. The detector 54 may be used to generate a focus error signal using any of a number of different well-known techniques, such as the spot-size technique described above in conjunction with FIG. 1B. The focus error signal may be used in a focus servo loop (not shown) to control the focus position of the incident radiation beam relative to the medium 46 by adjusting the position of objective lens 44.

The portion of the return beam which is not transmitted through surface 51 is reflected by surface 51 toward a lens 56 and through a general wave plate 58. The general wave plate 58 modifies the polarization of the portion of the return beam passing through it by a given retardance value between about 90° and 180°. The actual retardance value selected may vary with the application, as will be described below in conjunction with FIG. 3. Factors which should be taken into account in selecting a suitable retardance value include optical head properties, such as phase shifts introduced by beam splitters, and media properties such as media birefringence. Those skilled in the art will recognize that wave plate 58 may be used with any of a number of alternative retardance values and/or plate rotations. Details regarding selection of a suitable retardance value for wave plate 58 to optimize the read-out data signal-to-noise ratio in a given embodiment may be found in U.S. Pat. No. 5,282,188, which is assigned to the assignee of the present invention and incorporated by reference herein. It should be noted that the retardance value which produces an optimal data signal may not produce the optimal tracking signal, and therefore a trade-off between the data and tracking signal-to-noise ratios may be necessary.

The portion of the return beam transmitted through wave plate 58 is then applied to another polarization beam splitter 60. A surface 61 transmits a p-polarized component of the return beam to a first detector 62 and reflects an s-polarized component to a second detector 64. The polarization beam splitter surfaces 37, 51 and 61 may be, for example, multi-layer coatings which reflect and/or transmit desired amounts of s-polarized and p-polarized light. It should be noted that any of a number of alternative magneto-optic detection arrangements could be used in system 30. For example, the beam splitter 60 could be replaced with a Wollaston beam splitter and the position of detectors 62, 64 could be adjusted such that one detector receives components of the return beam having a p-polarization while the other receives components having an s-polarization. As another alternative, the general wave plate 58 could be replaced with a phase plate selected to remove phase ellipticity in the return beam, and beam splitter 60 could be a rotatable Wollaston beam splitter rotated to a fixed angle of about 45°. The beam splitter 60 could also be replaced with a larger beam splitter, such as beam splitter 50.

The data detectors 62, 64 may be used to provide a differential magneto-optic data signal, which is generally indicative of the data recorded on a magneto-optic medium scanned by the incident radiation beam, by applying the detected signal outputs of the two detectors to a signal combiner 65. The signal combiner may include, for example, a differential amplifier which receives detected signals from the two detectors and provides an output corresponding to the difference between the detected signals. Other signal combiners suitable for taking a difference between the first and second detected signals from detectors 62, 64, respectively, could also be used. Of course, the differential data signal could be generated from either pregrooved or non-grooved magneto-optic media.

The system 30 of FIG. 2 can also be used to generate a write-once sum data signal from, for example, a phase change or ablative write-once medium by summing the detected signals from detectors 62, 64. Data signals may thus be generated for both magneto-optic media and write-once media in the system of FIG. 2 by appropriate processing of the detected signals from detectors 62, 64. Additional signal combining electronics, of a type generally well-known in the art, may be included within signal combiner 65 to provide the write-once sum data signal.

An advantage of the present invention is that a tracking error signal may be generated from signals detected in detectors 62, 64 without the need for a media pregroove. An exemplary manner in which a tracking error signal is generated in the system of FIG. 2 will be further described below in conjunction with FIG. 3. As previously noted, the medium 46 generally includes marks arranged in the form of data tracks. The above-cited in-track edge detection references describe exemplary techniques for detecting the in-track edges of such marks to provide a data signal. The present invention detects data mark or tracking mark edges in a cross-track direction to generate a tracking error signal from a non-grooved medium. The present invention recognizes and makes use of the fact that the mark edges in the cross-track direction diffract the incident radiation beam such that the diffraction pattern may be detected and analyzed to indicate the presence or absence of a mark in a scanned region of the medium. Because in this embodiment the tracking error signal is derived using the differential data detectors 62, 64 it is also referred to herein as a differential tracking signal.

Figure 3:
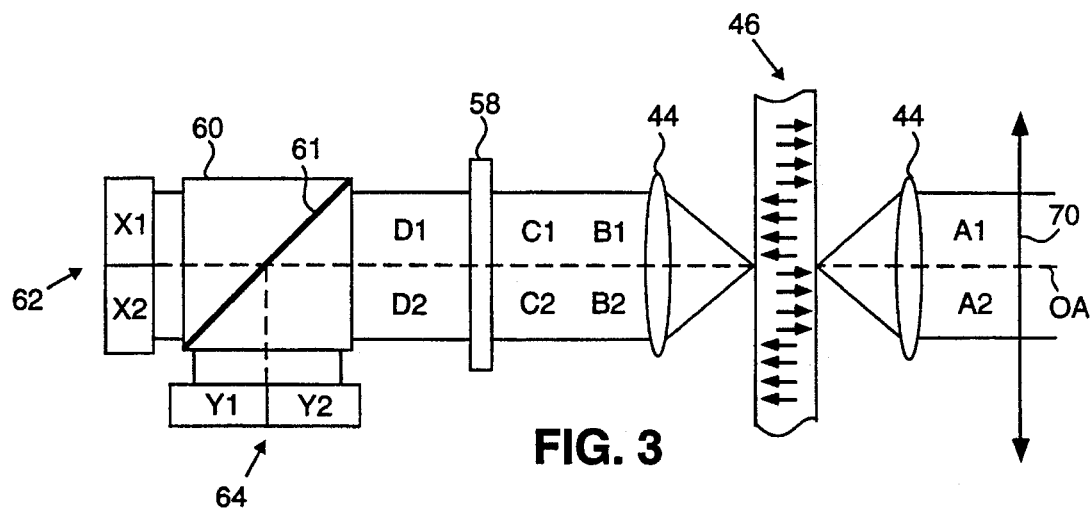
FIG. 3 is a diagram illustrating the generation of a tracking error signal in the exemplary system of FIG. 2.

FIG. 3 illustrates in simplified form the optical paths of an incident radiation beam applied to, and a return beam reflected and/or diffracted from, the optical recording medium 46 in the system of FIG. 2. For clarity, the incident beam and return beam paths are shown on opposite sides of the medium 46, rather than both on the same side of the medium as in FIG. 2. Also, certain beam processing elements, including polarization beam expander/splitter 36, polarization beam splitter 50 and lens 56 have been omitted from the return beam path shown in FIG. 3 for purposes of clarity. As shown in FIG. 3, the medium 46 includes marks, or areas of distinct magnetization, indicated by groups of arrows on the medium 46 directed either toward or away from the incident beam. The direction of the arrows on medium 46 indicates the direction of a magnetization vector in the corresponding area of the medium. A cross-track direction 70 on medium 46 is indicated by a double-headed arrow, and is perpendicular to a tangent to a data track at a point illuminated by the incident beam. A cross-track mark edge is indicated by a change in the direction of adjacent magnetization arrows on medium 46, and corresponds generally to a transition in the magnetization of the medium from one magnetization state to another. Any of a number of different mark arrangements may be used in accordance with the present invention. For example, previously-recorded data marks may be used. Alternatively, a preformatted tracking mark or set of tracking marks suitably arranged on the medium may be used. Additional detail regarding tracking marks may be found in, for example, U.S. patent application Ser. No. 08/322,659, Oct. 12, 1994, entitled "Apparatus and Method for Multi-Spot Sampled Tracking in an Optical Data Storage System," which is assigned to the assignee of the present invention and incorporated by reference herein.

The incident radiation beam is applied to the optical storage medium 46 via the objective lens 44 in the manner previously described. An optical axis of the incident and return radiation beams is designated by the dashed line OA, and is perpendicular to the cross-track direction 70 of the medium 46. In the example shown, the incident beam is focused on a cross-track edge of a mark on the medium 46, such that optical axis OA coincides with the cross-track edge. A given portion of an optical path on one side of the optical axis OA is referred to herein as a half-aperture. In general, the incident radiation beam is linearly polarized in the half-apertures designated A1 and A2 in FIG. 3. The linearly-polarized incident radiation beam in half-apertures A1 and A2 may be expressed in terms of right and left circular polarization states $E_R$ and $E_L$. Fields $E_{A1}$ and $E_{A2}$ in half-apertures A1 and A2, respectively, may be given by:

$$E_{A1}=E_{A2}=(E_R+E_L)/2.$$

The polarization states $E_R$ and $E_L$ will generally be diffracted in substantially equal and opposite amounts from the cross-track mark edge on which the incident radiation beam is focused in this example. As a result, the field in half-apertures B1 and B2 will be different than the field in half-apertures A1 and A2. If the amplitude of the diffracted light is given by $\delta$, the fields $E_{B1}$ and $E_{B2}$ in half-apertures B1 and B2, respectively, may be given by:

$$E_{B1}=[(1+\delta)E_R+(1-\delta)E_L]/2;$$

$$E_{B2}=[(1-\delta)E_R+(1+\delta)E_L]/2.$$

The same fields are present in the half-apertures designated C1 and C2 in the embodiment of FIG. 3. The general wave plate 58, as previously noted, may be selected to provide a retardance of between about 90° and 180° to the return beam passing therethrough and therefore partially or completely converts right circular polarization states to left circular polarization states and vice versa. In a preferred embodiment, the general wave plate 58 is oriented with its optical axis at an angle of 45° relative to the optical axis OA of the system, and is selected as a quarterwave plate to provide about 90° of retardance. The right and left circular polarization states will then be substantially converted to linear polarization states in the plane of FIG. 3, designated as polarization state $E_P$, and in a plane perpendicular to the plane of FIG. 3, designated as polarization state $E_N$. The fields $E_{D1}$ and $E_{D2}$ within half-apertures D1 and D2, respectively, can then be expressed as:

$$E_{D1}=[(1+\delta)E_P+(1-\delta)E_N]/2;$$

$$E_{D2}=[(1-\delta)E_P+(1+\delta)E_N]/2.$$

As described above, the polarization beam splitter 60 includes a surface 61 which will transmit a given polarization while reflecting a polarization perpendicular to the given polarization. For example, the polarization corresponding to $E_P$ could be transmitted to detector 62 while the polarization corresponding to $E_N$ is reflected to detector 64.

The detectors 62, 64 in this embodiment are dual-element detectors which include detector elements X1, X2 and Y1, Y2, respectively. Each detector element of the dual element detectors 62, 64 receives light of a given polarization from one of the half-apertures D1 or D2, and produces a detected signal corresponding to the amount of light incident thereon. X1, X2 and Y1, Y2 are thus referred to as half-aperture detector elements. The detector element designators will also be used herein to refer to the electrical current or voltage signals generated by the detectors. If X1, X2 and Y1, Y2 are detected current signals, and k designates the detector responsivity, corresponding sum signals may be expressed as follows:

$$(X1+X2)\propto k/4(1+\delta)^2;$$

$$(Y1+Y2)\propto k/4(1-\delta)^2.$$

It should be noted that the actual detected current also depends on a number of other factors, such as media and beam splitter reflectivity, laser power and the transmission properties of other elements in the optical path.

In an embodiment of the present invention in which general wave plate 58 is selected as a quarter-wave plate, a tracking error signal (TES) may be given by:

$$TES=(X1+Y2)-(X2+Y1).$$

If the incident radiation beam is centered on the edge of a mark as shown in FIG. 3, corresponding to an off-track position, the amplitude of the TES is proportional to $k\delta$ when approximated to the first order of $\delta$. The sign of the TES depends on whether the beam is off-track to one cross-track side of a mark or the opposite side. If the incident radiation beam is centered on a mark, corresponding to a proper tracking position, the TES has a value of about zero. An exemplary TES in accordance with the present invention thus varies from a value of about zero when the incident radiation beam is tracking properly to a maximum value of about plus or minus $k\delta$ when the beam is improperly centered on a cross-track edge. The TES can therefore be used in a tracking servo loop to maintain the radiation beam in the proper in-track position. In accordance with the present invention, the exemplary TES is responsive to variations in the return beam which result from diffraction of the incident beam by the cross-track mark edges. The resulting TES exhibits an insensitivity to defocus of the incident beam. For example, in one embodiment of the present invention, the TES maintained about 98% and 87% of its amplitude despite incident beam defocus of about 2.0 and 4.0 microns, respectively.

A data signal (DS) may be generated using the system of FIGS. 2 and 3 by combining the detected signals in the following manner:

$$DS=(X1+X2)-(Y1+Y2).$$

The general wave plate 58 in FIGS. 2 and 3 is selected as a quarter-wave plate to provide the exemplary TES shown above. It should be noted that other retardance values may be selected in order to, for example, optimize the signal-to-noise ratio in the data signal for different magneto-optic media, and may be influenced by factors such as media birefringence and phase shifts in the optical head. Exemplary techniques for optimizing signal-to-noise ratio in an optical storage system with a magneto-optic medium are described in the above-cited U.S. Pat. No. 5,282,188. It should also be noted that the TES and DS could be normalized to, for example, a sum data signal or a front facet monitor (FFM) signal. The TES could also be normalized to a differential data signal.

The TES described above is generated from a non-grooved magneto-optic medium. The system 30 of FIG. 2 may also be used to generate a TES from a write-once medium by, for example, combining the detected signals in accordance with the relationship $(X1+Y1)-(X2+Y2)$. Similarly, system 30 is able to generate a TES from a magneto-optic medium which includes a pregroove. The system 30 may thus be used in a multi-function optical drive capable of generating tracking error signals from grooved and non-grooved magneto-optic and write-once media.

Figure 4A:
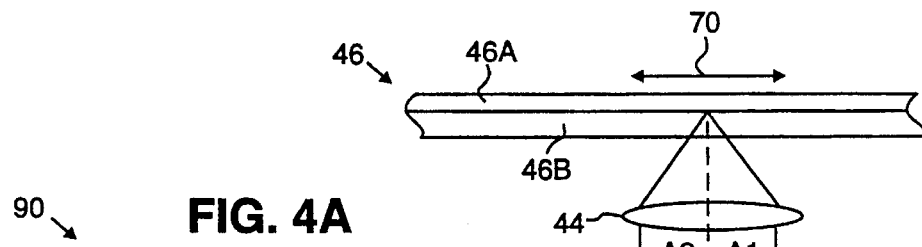
FIG. 4A is an alternative embodiment of an optical storage system in accordance with the present invention.

FIG. 4A shows an alternative embodiment of an optical system with differential tracking in accordance with the present invention. The system 90 includes a number of elements used in the system 30 of FIG. 2, and these common elements are designated by like numerals in FIG. 4A. A polarization beam splitter 104 with a surface 105 directs portions of an incident beam from source 32 to front facet detector 40 and medium 46. Unlike the system 30 in FIG. 2, the system 90 includes separate return beam paths for generating the tracking error signal and the data signal. A partial half-wave plate 92 is arranged in a half-aperture between the lens 56 and wave plate 58. In this embodiment, wave plate 58 is preferably selected as a quarter-wave plate with its optical axis oriented at an angle of about 45° relative to the optical axis OA of the system 90.

The fields $E_{B1}$ and $E_{B2}$ in half-apertures B1 and B2, respectively, may again be expressed as shown above. The partial half-wave plate 92 provides a retardance of about 180° in a half-aperture of an optical path of the return beam, and therefore substantially converts right circular polarization states to left circular polarization states and vice versa within the half-aperture. The fields $E_{C1}$ and $E_{C2}$ in half-apertures C1 and C2, respectively, can then be expressed as:

$$E_{C1}=E_{C2}=[(1-\delta)E_R+(1+\delta)E_L]/2.$$

The half-wave plate 92 thus produces substantially symmetric fields in half-apertures C1 and C2 in the embodiment of FIG. 4A. If the quarter-wave plate 58 is aligned with its optical axis rotated by about plus or minus 45° relative to the system optical axis OA, the right and left circular polarization states will be substantially converted to linear polarization states in the plane of FIG. 4A, designated as polarization state $E_p$, and in a plane perpendicular to the plane of FIG. 4A, designated as polarization state $E_N$. The fields $E_{D1}$ and $E_{D2}$ within half-apertures D1 and D2, respectively, can therefore be expressed in the following manner:

$$E_{D1}=E_{D2}=[(1-\delta)E_p+(1+\delta)E_N]/2.$$

Figure 4B:
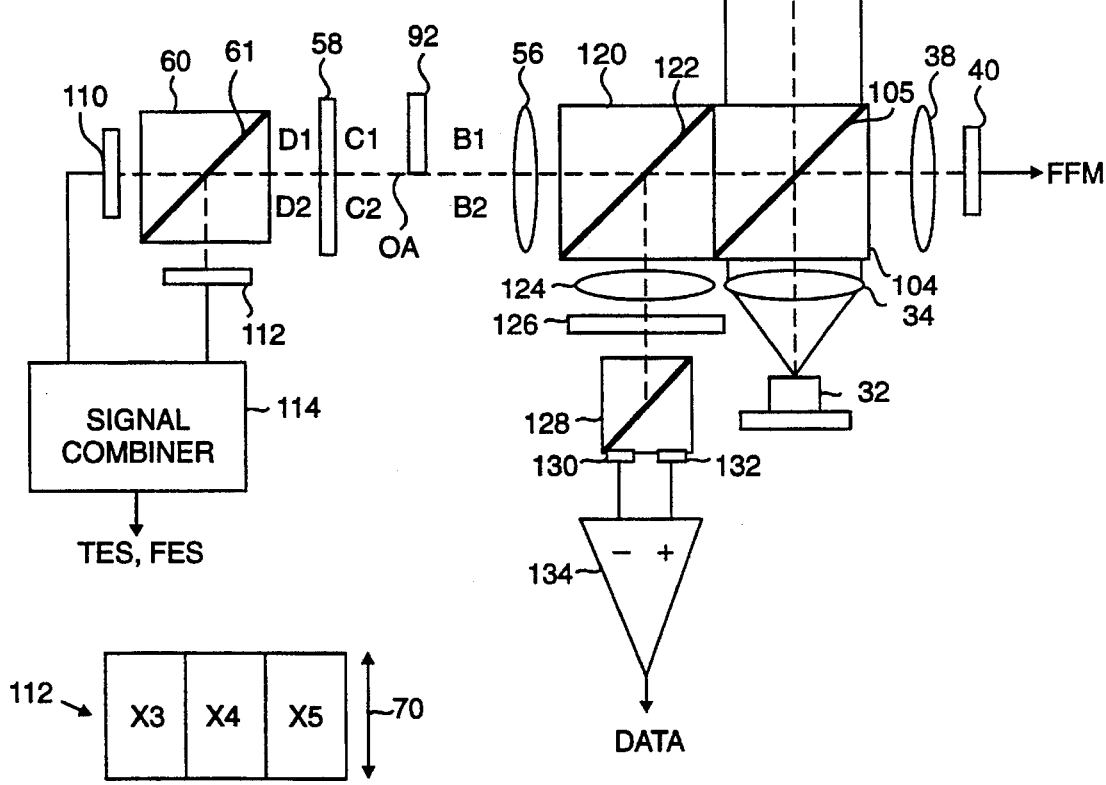
FIG. 4B shows a multi-element detector suitable for use in the exemplary system of FIG. 4A.

Polarization beam splitter 60 transmits the polarization components corresponding to $E_p$ to a detector 110 while the polarization components corresponding to $E_N$ are reflected to a detector 112. The detector 110 may include a single detector element which will be designated Y3. FIG. 4B shows an exemplary three-element version of detector 112 which includes detector elements X3, X4 and X5 separated along lines substantially parallel to the cross-track direction on the medium 46. The outer elements X3 and X5 are arranged on opposite sides of central element X4. Again, the detector element designations will also be used to refer to the current or voltage signals produced by the detectors. A tracking error signal (TES) may then be generated in accordance with the present invention by combining the detector signals in a signal combiner 114 as follows:

$$TES=(X3+X4+X5)-Y3.$$

As in the embodiment of FIG. 3, the TES varies from a value of about zero, for a proper tracking position, to an approximate value of either plus or minus $k\delta$ when the beam is off-track and centered on a cross-track mark edge, depending on whether the beam is off-track on one side of the mark or the other. As in the FIG. 2 embodiment, the TES may be normalized to, for example, a sum data signal, a differential data signal or a front facet monitor signal. A focus error signal (FES) may be generated in the system of FIG. 4A using the signals detected in detectors 110 and 112, by combining the detected signals in combiner 114 as follows:

$$FES=X4-(X3+X5).$$

A data signal (DS) may be generated in the system of FIG. 4A in the following manner. A beam splitter 120 or other suitable beam separating means separates the return beam reflected and diffracted from the medium 46 into two portions. A first portion is supplied to the lens 56 and is processed in the manner described above to generate a TES and FES, and a second portion is supplied to a lens 124, general wave plate 126 and polarization beam splitter 128. A surface 122 within beam splitter 120 divides the return beam such that substantially equivalent portions of the return beam polarization components are provided to each of the return beam paths. The polarization beam splitter 128 is shown as a Wollaston beam splitter, which separates perpendicular polarization components of the return beam by an angle, and supplies components of a first polarization to a detector 130 and components of a second polarization, perpendicular to the first, to a detector 132. Other types of polarization beam splitters could also be used. The detectors 130, 132 generate detected signals which are supplied to inverting and non-inverting inputs, respectively, of a differential amplifier 134. The amplifier generates a data signal as the difference between the detected signals from detectors 130, 132. In the embodiment of FIG. 4A, the retardance value of general wave plate 126 may be chosen to optimize the signal-to-noise ratio in the differential data signal, in the manner described in the above-cited U.S. Pat. No. 5,282,188, without influencing the quality of the tracking error signal.

The system 90 may also be used to generate a TES from a write-once medium, or from a magneto-optic medium with a pregroove. For example, detector 112 could be replaced with a six-element array in which each of the elements X3, X4 and X5 are divided in half along a line perpendicular to the cross-track direction 70. A write-once TES can then be generated by summing the detected signals from the upper three elements, and subtracting from that sum a sum of the detected signals from the lower three elements. Detector 110 could be divided into detector elements in a like manner instead of or in addition to detector 112. Detected signals from detector 110 could then be combined instead of or in addition to the signals from detector 112 to provide an FES and write-once or magneto-optic TES. As an alternative, detector 18 of FIG. 1B could be used in place of, for example, detector 112 or 110, and a write-once TES could be generated in accordance with the relationship c–d.

Although not shown in FIGS. 2 and 4A, systems 30 and 90 may include additional elements suitable for processing the detected signals. For example, an analog-to-digital converter, microprocessor, memory, and digital-to-analog convertor may be included to obtain and process samples of the data signals. The samples could be taken when, for example, the incident beam illuminates a portion or portions of a tracking mark placed on the medium, and then stored in memory and suitably processed to provide tracking control. The differential data signal samples could also be normalized to a sum data signal. Alternatively, the differential data signals could be normalized to samples of the front facet monitor or other source monitor signal. Additional detail regarding sampling of data and front facet monitor signals may be found in, for example, the above-cited patent application Ser. No. 08/322,659, filed Oct. 12, 1994, entitled "Apparatus and Method for Multi-Spot Sampled Tracking in an Optical Data Storage System."

The preferred embodiments of the present invention described above generate a differential tracking error signal from a magneto-optic storage medium in an optical data storage system. Although particularly well-suited for use with non-grooved magneto-optic media, the present invention may also provide improvements in other optical storage system applications, including, for example, write-once systems, and optical card and tape readers. Furthermore, many variations may be made in the arrangements shown, including, for example, the type of medium used, the type of tracking and/or data mark edges which reflect and diffract the incident radiation beam, the number and arrangement of detectors and detector elements, the manner in which the detected signals are combined to generate tracking error, focus error and data signals, and the type and arrangement of optical components used for directing and processing the incident and return radiation beams. These and other alternatives and variations will be readily apparent to those skilled in the art.

| PARTS LIST | |
|---|---|
| a, b, c, d | detector elements |
| A1, A2, B1, B2, C1, C2, D1, D2 | half-apertures |
| δ | diffracted light amplitude |

| PARTS LIST -continued | |
|---|---|
| $E_{A1}, E_{A1'}, E_{B1}, E_{B2'}, E_{C1}, E_{C2}, E_{D1}, E_{D2}$ | half-aperture fields |
| $E_R, E_L$ | circular polarization states |
| $E_P, E_N$ | linear polarization states |
| k | detector responsivity |
| OA | optical axis |
| X1–X5 | detector elements |
| Y1–Y3 | detector elements |
| 10 | magneto-optic recording medium |
| 12 | raised region |
| 14 | lower region |
| 16, 17 | magnetizations |
| 18 | detector |
| 20 | cross-track direction |
| 30 | optical data storage system |
| 32 | optical source |
| 34 | collimating lens |
| 36 | beam expander/splitter |
| 37 | surface |
| 38 | detector focusing lens |
| 40 | front facet detector |
| 44 | objective lens |
| 46 | optical storage medium |
| 46A | data storage surface |
| 46B | protective layer |
| 50 | polarization beam splitter |
| 52 | detector focusing lens |
| 54 | detector |
| 56 | lens |
| 58 | general wave plate |
| 60 | polarization beam splitter |
| 61 | surface |
| 62 | first detector |
| 64 | second detector |
| 65 | signal combiner |
| 70 | cross-track direction |
| 90 | optical data storage system |
| 92 | partial half-wave plate |
| 104 | polarization beam splitter |
| 105 | surface |
| 110, 112 | detectors |
| 114 | signal combiner |
| 120 | beam splitter |
| 122 | surface |
| 124 | lens |
| 126 | general wave plate |
| 128 | polarization beam splitter |
| 130, 132 | detectors |
| 134 | differential amplifier |

What is claimed is:

1. An apparatus for use in an optical system in which an incident radiation beam is applied to an optical storage medium having at least one mark formed thereon, the apparatus comprising:

means for separating a reflected beam, resulting from application of the incident beam to the medium, into a first polarization component and a second polarization component;

a first detector adapted to receive the first polarization component of the reflected beam and to generate a first detected signal therefrom;

a second detector adapted to receive the second polarization component of the reflected beam and to generate a second detected signal therefrom; and means for generating a tracking error signal from the first and the second detected signals;

wherein the tracking error signal is responsive to variations in the reflected beam resulting from diffraction of the incident beam by the mark on the medium.

2. The apparatus of claim 1 wherein the storage medium is a non-grooved magneto-optic medium.

3. The apparatus of claim 1 wherein the means for separating the reflected beam includes a polarization beam splitter arranged in an optical path of the reflected beam, the apparatus further including a general wave plate arranged in the optical path between the medium and the polarization beam splitter, the general wave plate having a retardance between about 90° and 180°.

4. The apparatus of claim 3 wherein the first and second detectors are dual-element detectors having half-aperture detector elements X1, X2 and Y1, Y2, respectively, and further wherein the means for generating the tracking error signal includes a signal combiner which generates the tracking error signal in accordance with the relationship (X1+Y2)−(X2+Y1).

5. The apparatus of claim 3 wherein the first and second detectors are dual-element detectors having half-aperture detector elements X1, X2 and Y1, Y2, respectively, and the apparatus further includes means for generating a data signal in accordance with the relationship (X1+X2)−(Y1+Y2).

6. The apparatus of claim 1 wherein the means for separating the reflected beam includes a polarization beam splitter arranged in an optical path of the reflected beam, the apparatus further including:

a partial half-wave plate arranged within a half-aperture of the optical path of the reflected beam between the medium and the polarization beam splitter; and a quarter-wave plate arranged in the optical path between the medium and the polarization beam splitter.

7. The apparatus of claim 6 wherein the means for generating a tracking error signal includes a signal combiner which subtracts the first detected signal and the second detected signal.

8. The apparatus of claim 6 wherein the first detector is a single element detector and the second detector is a three-element detector having a central detector element and two outer detector elements arranged on opposite sides of the central element, the central and outer elements separated along lines substantially parallel to a cross-track direction on the medium, and wherein the means for generating the tracking error signal includes a signal combiner which generates the tracking error signal by subtracting the first detected signal from the first detector and a sum of detected signals from the detector elements of the second detector, and wherein the apparatus further includes means for generating a focus error signal by subtracting a detected signal from the central detector element of the second detector and a sum of the detected signals from the outer elements of the second detector.

9. The apparatus of claim 6 further including:

means for separating the reflected beam into a first portion and a second portion, wherein the first portion of the beam is applied to the polarization beam splitter via the partial half-wave plate and the quarter-wave plate;

a second polarization beam splitter arranged in an optical path of the second portion of the reflected beam, to separate the second portion of the reflected beam into the first and second polarization components;

a general wave plate arranged in the optical path of the second portion of the reflected beam between the separating means and the second polarization beam splitter, the general waveplate having a retardance between about 90° and 180°;

third and fourth detectors for detecting the first and second polarization components of the second portion of the reflected beam to obtain third and fourth detected signals therefrom; and means for generating a data signal from the third and fourth detected signals.

10. The apparatus of claim 9 wherein the means for generating a data signal includes a differential amplifier having inputs adapted to receive the third and fourth detected signals.

11. A method of generating a tracking error signal in an optical system in which an incident radiation beam is applied to an optical storage medium having at least one mark formed thereon, the method comprising the steps of:

separating a reflected beam, resulting from application of the incident beam to the medium, into a first polarization component and a second polarization component;

detecting the first polarization component of the reflected beam to obtain a first detected signal;

detecting the second polarization component of the reflected beam to obtain a second detected signal; and generating a tracking error signal from the first and the second detected signals;

wherein the tracking error signal is responsive to variations in the reflected beam resulting from diffraction of the incident beam by the mark on the medium.

12. The method of claim 11 wherein the step of separating the reflected beam includes providing a polarization beam splitter arranged in an optical path of the reflected beam, the method further including the step of providing a general wave plate arranged in the optical path between the medium and the polarization beam splitter, the general wave plate having a retardance between about 90° and 180°.

13. The method of claim 12 wherein the step of providing a general wave plate includes providing a wave plate having a retardance of about 90°.

14. The method of claim 12 wherein the steps of detecting the first and second polarization components to obtain first and second detected signals further include detecting the components in first and second dual-element detectors having half-aperture detector elements X1, X2 and Y1, Y2, respectively, and further wherein the step of generating the tracking error signal includes generating the signal in accordance with the relationship (X1+Y2)−(X2+Y1).

15. The method of claim 12 wherein the steps of detecting the first and second polarization components to obtain first and second detected signals further include detecting the components in first and second dual-element detectors having half-aperture detector elements X1, X2 and Y1, Y2, respectively, and wherein the method further includes the step of generating a data signal from the first and second detected signals in accordance with the relationship (X1+X2)−(Y1+Y2).

16. The method of claim 11 wherein the step of separating the reflected beam further includes providing a polarization beam splitter arranged in an optical path of the reflected beam, the method further including the steps of:

providing a partial half-wave plate arranged within a half-aperture of the optical path of the reflected beam between the medium and the polarization beam splitter; and providing a quarter-wave plate arranged in the optical path between the medium and the polarization beam splitter.

17. The method of claim 16 wherein the step of generating a tracking error signal includes subtracting the first detected signal and the second detected signal.

18. The method of claim 16 wherein the steps of detecting the first and second polarization components and generating the tracking error signal further include the steps of:

providing a first detector having a single detector element;

providing a second detector having a central detector element and two outer detector elements arranged on opposite sides of the central detector element, the detector elements separated along lines substantially parallel to a cross-track direction on the medium; and generating the tracking error signal by subtracting the first detected signal from the first detector and a sum of the detected signals from the second detector;

wherein the method further includes the step of generating a focus error signal by subtracting a detected signal from the central detector element of the second detector and a sum of detected signals from the outer elements of the second detector.

19. The method of claim 16 further including the steps of:

separating the reflected beam into a first portion and a second portion, wherein the first portion of the reflected beam is applied to the polarization beam splitter via the partial half-wave plate and the quarter-wave plate;

separating the second portion of the reflected beam into the first and second polarization components;

providing a general wave plate arranged in the optical path of the second portion of the reflected beam, the general wave plate having a retardance between about 90° and 180°;

detecting the first and second polarization components of the second portion of the reflected beam to obtain third and fourth detected signals therefrom; and generating a data signal from the third and fourth detected signals.

20. The method of claim 19 wherein the step of generating a data signal includes subtracting the third and fourth detected signals.

\* \* \* \* \*